July 7, 1931.   T. PALLESON   1,813,314
CAMERA ATTACHMENT
Filed Oct. 3, 1929   2 Sheets-Sheet 1

Inventor
Thomas Palleson
By Clarence A. O'Brien
Attorney

July 7, 1931.   T. PALLESON   1,813,314
CAMERA ATTACHMENT
Filed Oct. 3, 1929   2 Sheets-Sheet 2
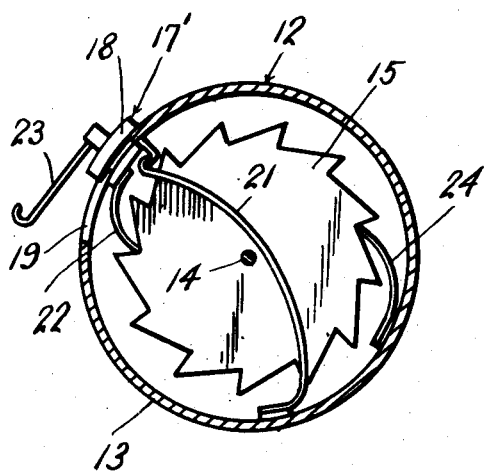
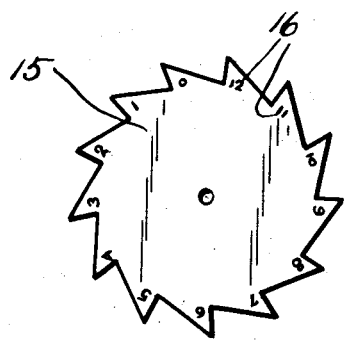
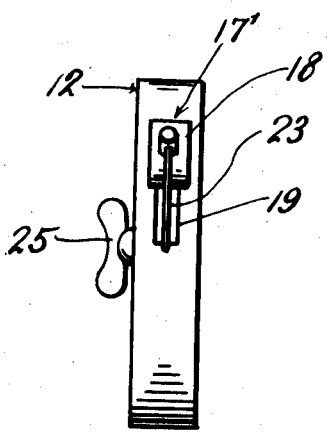
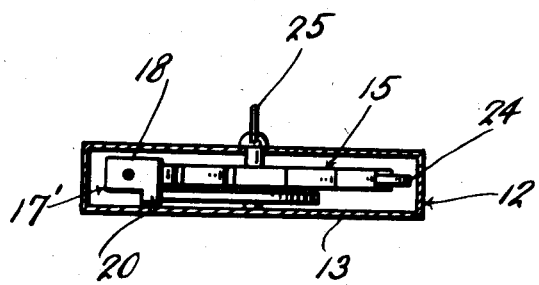
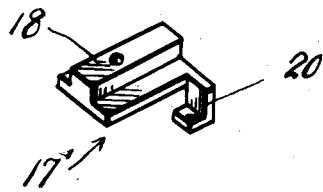
Inventor
Thomas Palleson
By Clarence A. O'Brien
Attorney Patented July 7, 1931

1,813,314

UNITED STATES PATENT OFFICE

THOMAS PALLESON, OF SCOTIA, CALIFORNIA

CAMERA ATTACHMENT

Application filed October 3, 1929. Serial No. 397,026.

This invention relates to an appliance in the nature of attachments for a conventional photographic camera of the customary portable or domestic type, wherein numbered films are employed for taking pictures.

In the usual type of camera found on the market at this time, the back of the roll of film is numbered to indicate the distinct exposure areas or fields and when the film is properly placed on the reel in the camera, the numbers are consecutively exposed through a window to enable the user to bring the exposure areas into play in proper order. It is a matter of common knowledge, however, that through forgetfulness or mistake, the film is inadvertently not turned after each exposure, the result is that two pictures are frequently taken on the same area of the film. This is annoying, expensive and objectionable.

With the foregoing in mind I have evolved and produced a simple, inexpensive appliance that can be attached to the housing of the camera on the exterior in a position to cooperate with the shutter trip or finger lever so that the user can readily determine how many pictures have been taken and whether the film is properly set for the next picture. This device therefore functions as an indicator or calculator and bodily adds to systematic and errorless work.

In carrying the invention to effect I have developed what I believe to be a practicable structure which is susceptible of application to the exterior of the camera without requiring alterations and which is positive and dependable in action and otherwise capable of fulfilling the requirements of a device of this character.

The particular construction and arrangement of elements will become more readily apparent from the following description and drawings.

In the drawings:—

Figure 3 is a sectional view through the attachment itself.

Figure 4 is an elevational view of the rotary ratchet wheel or indicator.

Figure 5 is an edge view of the structure seen in Figure 3 observing the same in the direction from left to right.

Figure 6 is a horizontal section centrally through the structure seen in Figure 5.

Figure 7 is a perspective view of one of the details.

Figure 1:
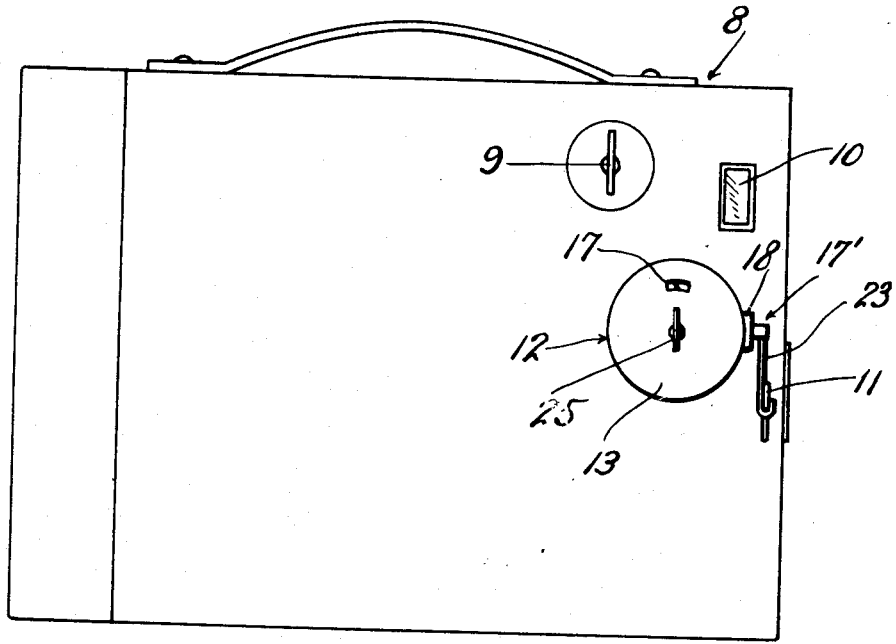
Figure 1 is a side elevational view of a conventional camera with the device in operative position.
Figure 2:
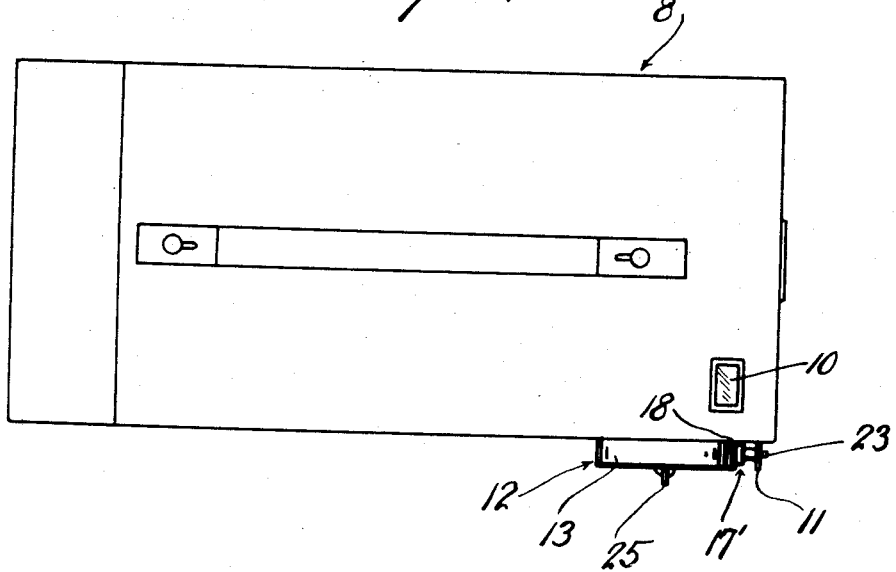
Figure 2 is a top plan view of the same.

Referring now to the drawings by numerals it will be seen that the camera is generally designated by the reference character 8 and is of the usual construction and includes an actuator 9 for the winding spool (not shown). The reference character 10 designates a sight window and 11 a lever or trip such as usually provided for actuating the shutter or mechanism by hand. The improved attachment is generally designated by the reference character 12 and as before indicated the same co-operates with the finger lever 11. As seen in Figure 3 this attachment comprises a disc like hollow casing 13 of appropriate material having a centralized shaft 14 journaled in suitable bearings and carrying a rotary indicator 15. This is provided with peripheral teeth and therefore functions as a ratchet wheel. Moreover it is formed at one side with a multiplicity of consecutive graduations 16 adapted to successively register with a sight window 17 as represented in Figure 1. Mechanism is provided for actuating this indicator through the medium of the lever 11. This preferably comprises an actuator generally designated by the reference character 17' and this comprising a shoe 18 of the construction seen in Figure 7 which has a portion slidable in a peripheral arcuate slot 19 formed in one side of the casing. On the interior of the shoe is a hook 20 which engages with a hooked end of a flat spring 21 anchored in the casing. This is a return spring for the actuator 17'. The actuator is also provided with a flexible finger 22 at the interior of the casing which engages successively with the teeth of the ratchet wheel. Then too on the exterior is a coupling hook 23 which engages with the aforesaid lever 11, as seen in Figures 1 and 2. Also in the casing is a spring pawl 24 for preventing retrograde rotation of the indicator disc. Finally I call attention to a finger piece or knob 25 carried by the shaft 14 and located on the exterior of the casing 13 for rotating the disc by hand to set the same at the desired point before starting.

With this arrangement it is obvious that as each picture is taken or the film exposed, the operator pushes down on the lever 11 in the usual way. Obviously, through the medium of the slidable actuator 17', the latter is moved down with the lever. This pushes the finger 22 against the ratchet wheel 15 and turns it one step. The pawl 24 prevents retrograde rotation. The result is that the numerals or indicators 16 are successively exposed through the sight opening 17 to indicate the number of pictures taken up to a given time. With the aid of this device even though the user is negligent in taking pictures, the device will show how may exposures have been made.

It is thought that by carefully considering the description in connection with the drawings, a clear understanding of the construction, operation and features and advantages of the improvement will be quite clear to persons skilled in the art to which the invention relates. Therefore, a more lengthy description is regarded as unnecessary.

Minor changes in shape, size, material and rearrangement of details coming within the field of invention claimed may be resorted to in actual practice if desired.

I claim:—

An indicating attachment of the character described for cameras, a circular casing adapted to be mounted on the camera adjacent the shutter operating lever thereof and having an observation window in one side and a peripheral slot, a ratchet wheel mounted for rotation in the casing having indicating numerals on one side thereof for successive registry with the window upon actuation of the ratchet wheel, a shoe slidably mounted for reciprocating movement on the inner periphery of the casing and having an integral rib thereon disposed for longitudinal sliding movement in the slot, means for operatively connecting the shoe to the shutter lever for actuation thereby in one direction, a resilient pawl mounted on the shoe for movement therewith and having its free end operatively engaged with the periphery of the ratchet wheel in a manner to actuate said wheel in a step by step manner upon reciprocatory movement of the shoe to successively bring the indicating numerals before the window, a hook formed integrally on the shoe and extending inwardly therefrom, and a spring disposed in the casing and having one end secured thereto and its free end terminating in a hook operatively engaged with the first named hook in a manner to return the shoe to inoperative position.

In testimony whereof I affix my signature.

THOMAS PALLESON.